United States Patent [19]

Akiyama et al.

[11] Patent Number: 5,385,077
[45] Date of Patent: Jan. 31, 1995

[54] BRAID AND BRAIDING METHOD

[75] Inventors: Yasuo Akiyama, Kyoto; Zenichiro Maekawa, Amagasaki; Hiroyuki Hamada, Kyoto; Atsushi Yokoyama, Kyoto; Yassushi Uratani, Ohtsu, all of Japan

[73] Assignee: Murata Kikai Kabushiki Kaisha, Kyoto, Japan

[21] Appl. No.: 6,059

[22] Filed: Jan. 19, 1993

Related U.S. Application Data

[62] Division of Ser. No. 694,385, May 1, 1991, abandoned.

[30] Foreign Application Priority Data

May 11, 1990 [JP] Japan .................. 2-049371
Aug. 29, 1990 [JP] Japan .................. 2-227079

[51] Int. Cl.6 .............................................. D04C 1/00
[52] U.S. Cl. .............................................. 87/8; 87/50
[58] Field of Search .................. 87/1, 5, 7, 8, 23, 28, 87/30, 33, 50

[56] References Cited

U.S. PATENT DOCUMENTS

| | | | |
|---|---|---|---|
| 450,684 | 4/1891 | Struss | 87/50 |
| 856,985 | 6/1907 | Rohm | 87/30 |
| 1,849,627 | 3/1932 | Krissiep | 87/7 |
| 1,850,320 | 3/1932 | French | 87/7 |
| 4,719,837 | 1/1988 | McConnell et al. | 87/1 |
| 4,847,063 | 7/1989 | Smith | 87/1 X |

FOREIGN PATENT DOCUMENTS

| | | | |
|---|---|---|---|
| 1019041 | 11/1957 | Germany | 87/50 |
| 2011492 | 8/1971 | Germany | 87/50 |
| 264055 | 10/1990 | Japan | 87/5 |

*Primary Examiner*—Joseph J. Hail III
*Attorney, Agent, or Firm*—Spensley Horn Jubas & Lubitz

[57] ABSTRACT

A braiding method comprising moving bobbin carriers along tracks connecting a plurality of braiding regions to braid cords or strands in a specific braiding region, in another braiding region or in all the braiding regions. The braid may be used as core structure for fiber-reinforced plastics.

8 Claims, 4 Drawing Sheets

BRAIDING REGION A        BRAIDING REGION B

1

BRAID AND BRAIDING METHOD

This is a division of application Ser. No. 07/694,385 filed on May 1, 1991, now abandoned.

FIELD OF THE INVENTION

The present invention relates to braids which may be applicable to fiber-reinforced plastics as core structure, and relates to a method for producing the same.

RELATED ART STATEMENT

A conventional braiding machine manufactures mostly flat braids and tubular braids having a circular sectional shape, and the most the conventional braiding machine can manufacture are slightly modified flat braids and tubular braids.

Circular tracks of the conventional braiding machines have a simple shape; that is, circular tracks of a flat-braiding machine are formed so as to intersect each other on the disk of the flat-braiding machine and have the shape of a circle having one break, and circular tracks of a tubular-braiding machine have the shape of a closed circle.

The conventional simple braiding machine is incapable of manufacturing braids of a complicated construction, such as a braid having an optional arrangement of flat portions and tubular portions down its length, and a braid having an optional arrangement of single-tube portions and double-tube portions down its length. Therefore, such braids of a simple construction manufactured by the conventional simple braiding machine have been used as core structures for fiber-reinforced plastics in limited fields of application.

OBJECT AND SUMMARY OF THE INVENTION

It is an object of the present invention to provide a method of forming fancy braids capable of expanding the field of application of fiber-reinforced plastics employing braids as core structures.

To achieve the object, the present invention provides a braid forming method comprising moving bobbin carriers along tracks connecting a plurality of braiding regions to braid in a specific braiding region, in another braiding region or in all the braiding region.

This braid forming method moves the bobbin carriers across different braiding regions during the braiding operation to form braided portions of different constructions down the length of a braid or to form a braid having a complicated sectional construction.

It is another object of the present invention to provide a braiding machine capable of forming an H-section braid having a cross section resembling the letter H without entailing interference between the bobbin carriers, and to provide an H-section braid.

To achieve the object, the another embodiment of the present invention provides a braiding machine having a ring track comprising a linear transfer section, a set of two semicircular sections connected to one end of the linear transfer section, a set of two semicircular sections connected to the other end of the linear transfer track, and a circular sidetrack connected to the linear transfer track.

DETAILED DESCRIPTION OF PREFERRED EMBODIMENT

A braiding machine for forming a braid in accordance with the present invention is basically similar to an ordinary flat-braiding machine and an ordinary tubular-braiding machine, and has a disk provided with intertwining tracks, and a plurality of bobbin carriers capable of moving counterclockwise or clockwise along the tracks for braiding. Cords or fiber bundles drawn out from the bobbins mounted on the bobbin carriers are braided as they are guided to a gathering guide disposed above the center of the disk. Each bobbin carrier is rotated by a drive gear disposed under the disk while the same moves along the tracks. The ratio between the moving speed of the bobbin carriers and the braid drawing speed can be changed by changing the gear ratio, so that braids differing from each other in the angle of strands.

Braiding method in two preferred embodiments according to the present invention will be described hereinafter with reference to the accompanying drawings.

A braiding method in a first embodiment will be described with reference to FIGS. 1a to 1c.

Figure 1A:
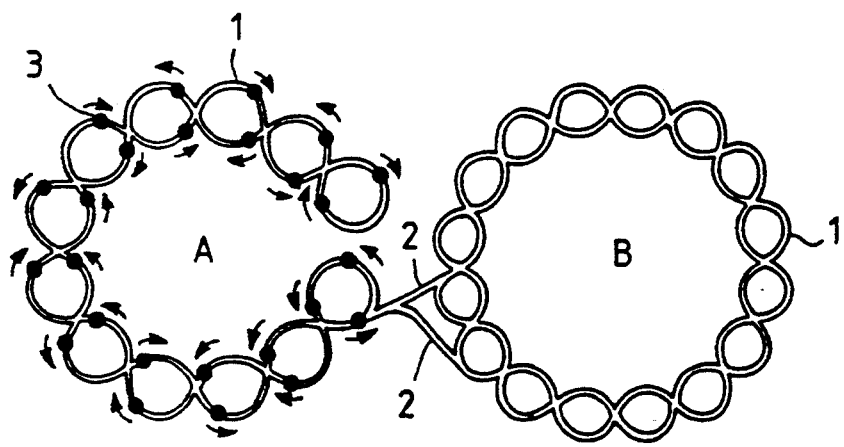
FIGS. 1a to 1c are diagrams of the arrangement of tracks of a braiding machine employed in carrying out a braiding method embodying the present invention.
Figure 1B:
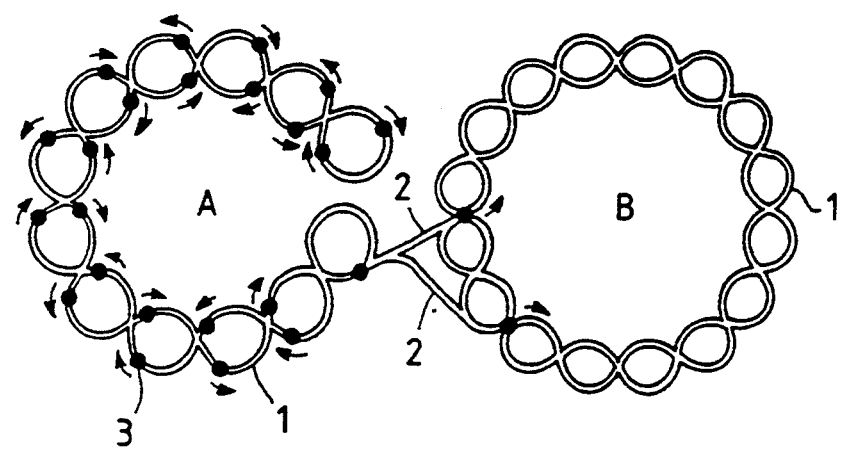
Figure 1C:
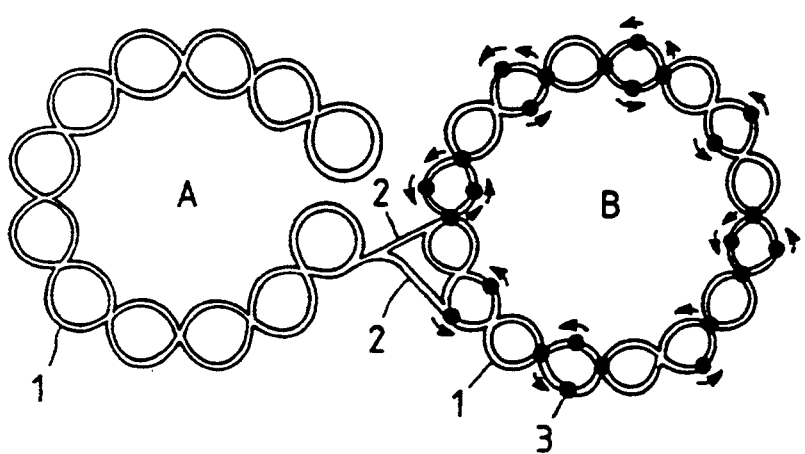

In FIGS. 1a to 1c, indicated at A is a first braiding region provided with tracks 1 arranged in an open circle to form a flat braid, and at B is a second braiding region provided with tracks 1 arranged in a closed circle to form a tubular braid. The first braiding region A and the second braiding region B are connected by transfer tracks 2.

A flat braid is formed while bobbin carriers 3 are moved in the first braiding region A as shown in FIG. 1a, and a tubular braid is formed while the bobbin carriers 3 are moved in the second braiding region B as shown in FIG. 1c. In a state shown in FIG. 1b, two bobbin carriers 3 have been transferred from the first braiding region A to the second braiding region B.

A gathering guide defining a braiding point where the cords or fiber bundles are collected and braided can be shifted between a position above the center of the first braiding region A and a position above the center of the second braiding region B. The gathering guide is located above the center of the first braiding region A in braiding only a flat braid, and is located above the center of the second braiding region B in braiding only a tubular braid.

The bobbin carriers 3 are transferred from the first braiding region A to the second braiding region B or in reverse, or the bobbin carriers 3 are moved in both the braiding regions A and B to form various braids. For example, it is possible to form the head and tail portions of a braid by moving the bobbin carriers in the first braiding region A and to form the intermediate portion of the braid by moving the bobbin carriers 3 in both the first braiding region A and the second braiding region B. In such a mode of braiding operation, it is possible to form the braid in a uniform density by drawing the braid at a drawing speed twice a drawing speed for forming the intermediate portion in forming the head and tail portions of the braid. In changing the braiding region, the gates of the two transfer tracks 2 are operated properly.

A braiding method in a second embodiment according to the present invention will be described with reference to FIG. 2.

Figure 2:
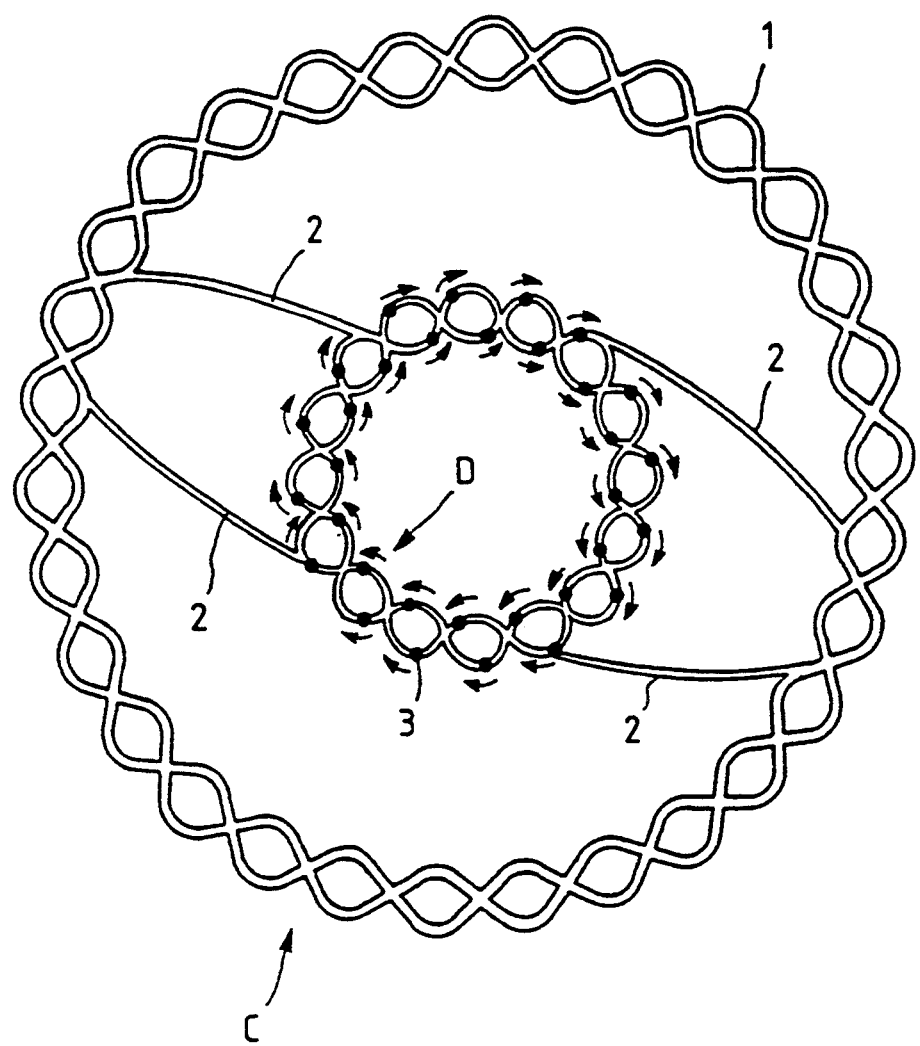
FIG. 2 is a diagram of the arrangement of tracks of another braiding machine employed in carrying out a braiding method embodying the present invention.

In FIG. 2, indicated at C and D are first and second braiding regions, respectively, each provided with tracks 1 arranged in a closed circle to form tubular braids. The braiding regions C and D are connected by transfer tracks 2.

Bobbin carriers 3 are moved in the first braiding region C to form a tubular braid of a larger diameter, and the bobbin carriers 3 are moved in the second braiding region D to form a tubular braid of a smaller diameter. In FIG. 2, the bobbin carriers are moving in the second braiding region D to form a tubular braid of a smaller diameter.

The braiding method in the second embodiment, similarly to the braiding method in the first embodiment, transfers the bobbin carriers 3 from the first braiding region C to the second braiding region D or in reverse, or the bobbin carriers 3 are moved in both the braiding regions C and D to form various braids. For example, it is possible to form the head portion of a braid by moving the bobbin carriers in the first braiding region C, to form the tail portion of the same by moving the bobbin carriers in the second braiding region D, and to form the intermediate portion of the same by moving the bobbin carriers in both the first braiding region C and the second braiding region D. When the bobbin carriers are moved in both the braiding regions C and D, a tubular braid of a double-wall construction consisting of an outer tubular braid of a larger diameter and an inner tubular braid of a smaller diameter interconnected at appropriate positions by cords. In changing the braiding region, the gates of the transfer tracks 2 are operated properly. In forming a tubular braid of a double-wall construction, most of the bobbin carriers 3 must remain in the braiding regions C and D, and the rest of the bobbin carriers 3 must move alternately between the braiding regions C and D to interconnect the outer tubular braid of a larger diameter and the inner tubular braid of a smaller diameter instead of simultaneously shifting all the bobbin carriers 3 from the first braiding region C to the second braiding region D or in reverse.

Thus, braids of various sectional shapes can be formed by the braiding method. The braids are formed of strands of glass fibers, carbon fibers, aramide fibers or the like and are used as core structures for fiber-reinforced plastics. Fiber-reinforce plastics employing a braid formed by the braiding method in accordance with the present invention as a core structure can more easily be molded than those employing a core structure constructed by combining a flat braid and a tubular braid, and the fiber-reinforced plastics employing a braid formed by the braiding method in accordance with the present invention has a high strength.

Since the component strands or cords of the braid extend obliquely, the braid is stretchable, and hence the braid is applied effectively to an article to be subjected to repetitive bending.

As is apparent from the foregoing description, the present invention has the following advantages.

The present invention enables forming various braids of different sectional shapes. The present invention is capable of forming a braid having a complicated sectional shape, which, otherwise, must be formed by combining and connecting a flat braid and a tubular braid. The braid having a complicated sectional shape facilitates molding fiber-reinforced plastics employing the same as a core structure, and the fiber-reinforced plastics have high strength. Thus, the present invention further expands the field of application of fiber-reinforced plastics employing a braid as a core structure.

Still another embodiment of the present invention will be described with reference to FIGS. 3 and 4.

The conventional braiding machine is unable to form an H-section braid simply by arranging the circular tracks in an H-shaped arrangement, because the bobbin carriers moving toward each other in forming the middle connecting portion of the H-shaped section interfere with each other.

This embodiment relates to a braiding machine having a ring track comprising a linear transfer section, a set of two semicircular sections connected to one end of the linear transfer section, a set of two semicircular sections connected to the other end of the linear transfer track, and a circular sidetrack connected to the linear transfer track.

The braiding machine thus constructed moves bobbin carriers along the intertwining ring track to form a braid by intertwining strands drawn out from bobbins mounted on the bobbin carriers, and the braid is wound up gradually through a gathering guide located above the center of the ring track.

When the bobbin carriers move along the linear transfer section toward each other, either one or the other of the bobbin carriers moving toward each other is guided into the sidetrack to avoid the collision of the bobbin carriers on the linear transfer track.

A braid manufactured by the braiding machine has a cross section resembling the letter H, and the component strands of the braid extend obliquely so as to intersect each other.

Figure 3:
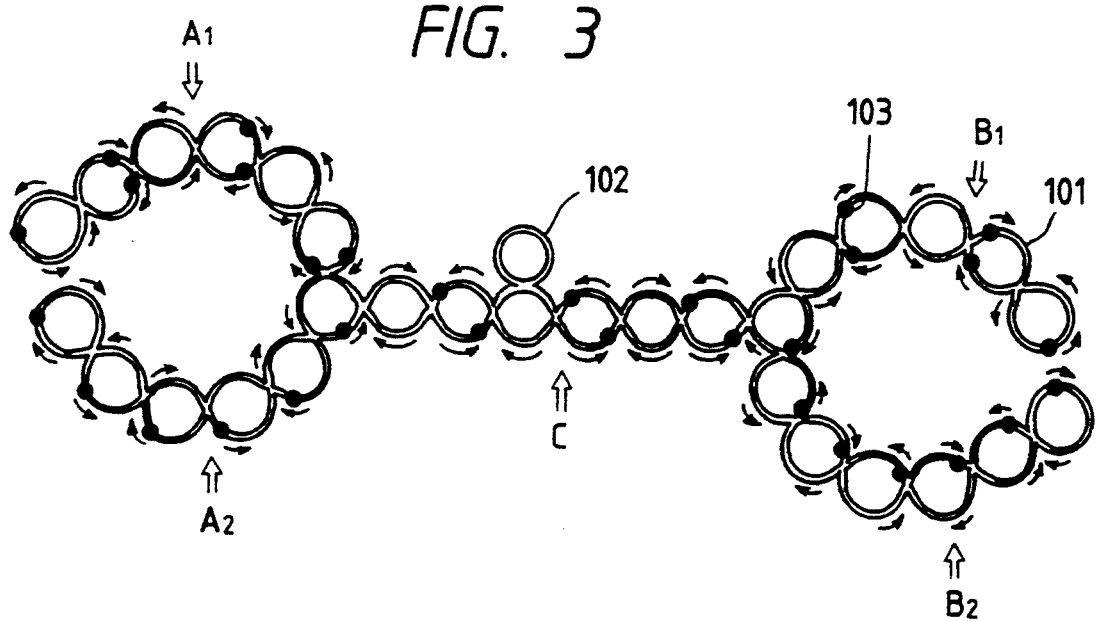
FIG. 3 is a plan view of a ring track employed in a braiding machine in accordance with the still another embodiment the present invention.

As shown in FIG. 3, a braiding machine embodying this embodiment has a disk provided with an intertwining ring track 101 consisting of a linear, central transfer section C, a set of two semicircular sections $A_1$ and $A_2$ joined to one end of the transfer section C, and a set of two semicircular sections $B_1$ and $B_2$ joined to the other end of the transfer section C. The set of two semicircular sections $A_1$ and $A_2$, and the set of two semicircular sections $B_1$ and $B_2$ have the shape of an open circle.

A sidetrack 102 is connected to the central section C to avoid interference between bobbin carriers 103 moving toward each other along the central section C. The position of the sidetrack 102 is dependent on the number of bobbin carriers 103 engaging the ring track 101 and must be determined properly in relation to the number of bobbin carriers 103.

The plurality of bobbin carriers 103 are moved along the intertwining track while cords or strands are drawn out from bobbins mounted on the bobbin carriers 103 to braid the strands. The strands are braided in a braid at a gathering guide located above the central portion of the ring track 101 and the braid is wound up gradually. The bobbin carriers 103 are moved and rotated by drive gears provided under the disk.

When the bobbin carriers are moved toward each other along the transfer section C, either one or the other of the bobbin carriers 103 is guided into the side track to avoid the collision of the bobbin carriers 103 in the transfer section C.

Figure 4:
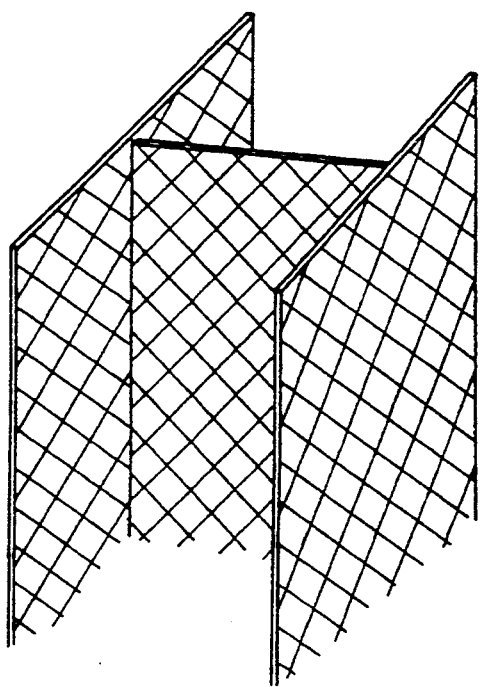
FIG. 4 is a perspective view of an H-section braid in accordance with the present invention.
Figure 5:
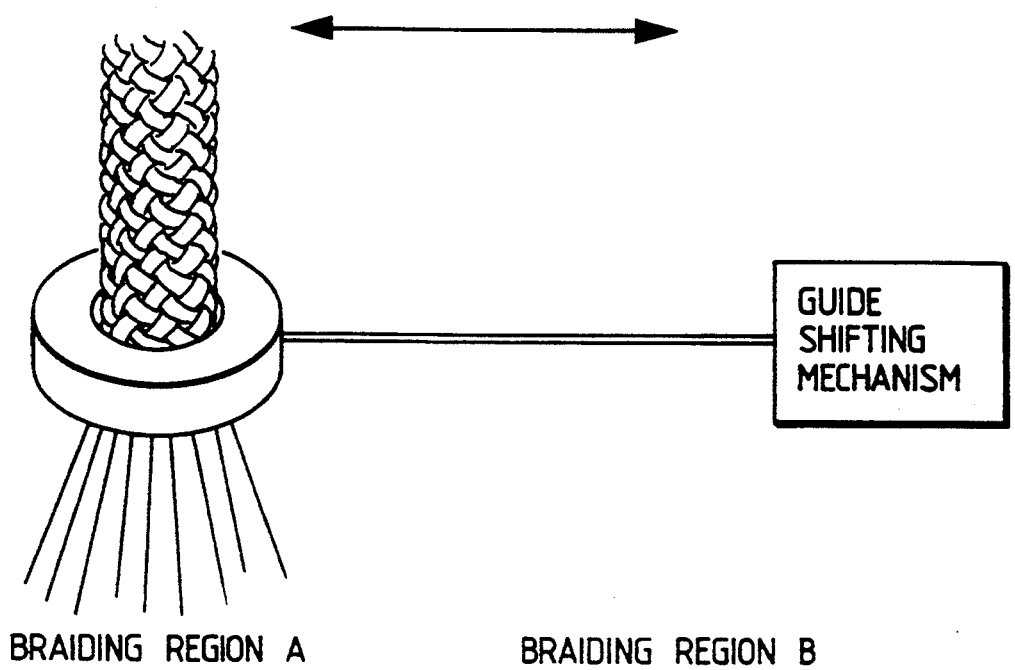
FIG. 5 is a perspective view of the gathering guide in accordance with one embodiment of the present invention.
Figure 6:
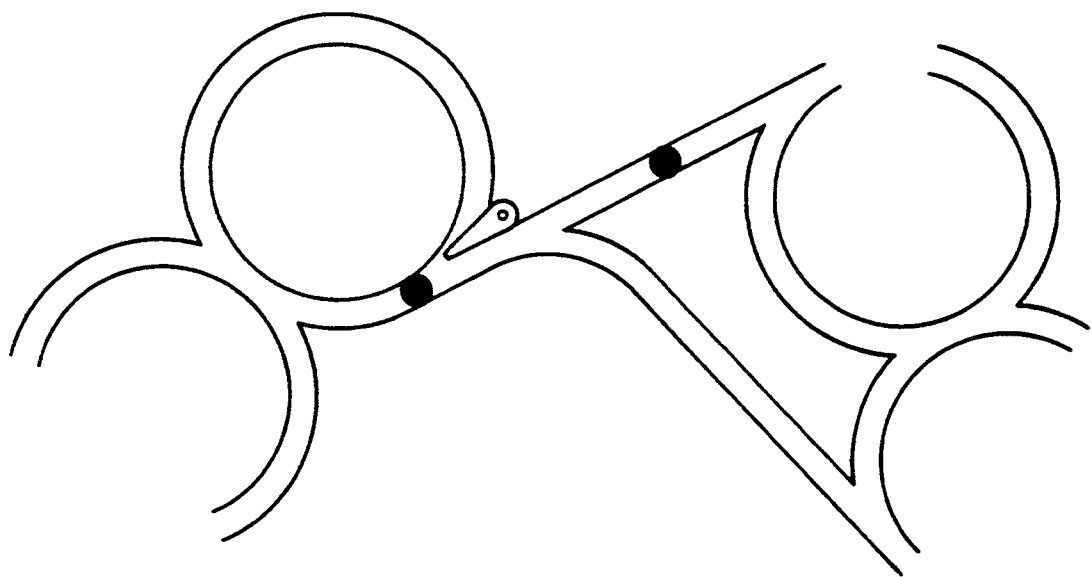
FIG. 6 is a plan view of a gate in accordance with one embodiment of the invention.

As shown in FIG. 4, the braid thus formed by the braiding machine has a cross section resembling the letter H when portions formed while the bobbin carriers 103 are moved respectively in the semicircular sections $A_1$ and $A_2$, and the semicircular sections $B_1$ and $B_2$ are expanded.

The braid may be formed of glass fibers or carbon fibers and may be used as a reinforcement for fiber-reinforced plastics. A molding process employing an integral H-section reinforcement, i.e., the braid of the present invention, is far simpler than that employing an H-section reinforcement constructed by combining individual flat braids or tubular braids, and the strength of fiber-reinforced plastics having the integral H-section reinforcement is higher than that of fiber-reinforced plastics having the reinforcement constructed by combining flat braids or tubular braids.

The braid is stretchable to some extent because the component strands of the braid are intertwined and extend obliquely, and hence the braid is used effectively as a reinforcement for fiber-reinforced plastics subject to repetitive bending.

As is apparent from the foregoing description, the device of this embodiment has the following advantages.

The braiding machine in accordance with the present invention is capable of forming an H-section braid without causing interference between the bobbin carriers. When used as a reinforcement for fiber-reinforced plastics, the H-section braid facilitates molding more effectively than an H-section reinforcement constructed by combining flat braids or tubular braids, and fiber-reinforced plastics employing the H-section braid of the present device have a high strength. The braid of the present device is particularly effective when used as a reinforcement for fiber-reinforced plastics subject to repetitive bending.

What is claimed is:

1. A braiding machine having a track along which bobbin carriers are moved, the braiding machine comprising:

a substantially linear transfer section having a first end and a second end, two substantially semicircular sections connected to the first end of the transfer section, two substantially semicircular sections connected to the second end of the transfer section, and collision prevention means for preventing collision of bobbin carriers travelling in substantially opposite directions in the transfer section, the collision prevention means comprising a substantially circular sidetrack connected to the transfer section onto which sidetrack the bobbin carriers are shuntable.

2. A braiding method, comprising:

providing a substantially linear transfer track section having a first end and a second end, connecting two substantially semicircular track sections to the first end of the transfer section, connecting two substantially semicircular track sections to the second end of the transfer section, connecting a substantially circular sidetrack to the transfer track section, providing bobbins having strands on bobbin carriers, moving the bobbin carriers along the track, drawing out the strands from the bobbins provided on the bobbin carriers, intertwining the drawn out strands to form a braid, and shunting at least one bobbin carrier moving in the transfer section onto the sidetrack to thereby prevent collision between the at least one bobbin carrier and another bobbin carrier moving in the transfer section in a direction substantially opposite to the at least one bobbin carrier.

3. A braided structure made in accordance with the method of claim 2.

4. The method of claim 2, wherein the step of intertwining the strands to form a braid comprises the step of intertwining the strands to form a braid having a cross section resembling the letter "H".

5. A braided structure made in accordance with the method of claim 4.

6. The method of claim 2, wherein the step of providing bobbins having strands on bobbin carriers comprises the step of providing bobbins having strands comprising at least one of a glass fiber, a carbon fiber and an aramide fiber.

7. A braided structure made in accordance with the method of claim 6.

8. The method of claim 2, comprising the step of using the braid as a core structure for a fiber-reinforced plastic.

* * * * *